(12) United States Patent
Takahashi et al.

(10) Patent No.: US 10,536,855 B2
(45) Date of Patent: Jan. 14, 2020

(54) INFORMATION PROCESSING TERMINAL, INFORMATION PROCESSING SYSTEM, PROGRAM, AND CONTROL METHOD

(71) Applicant: Konica Minolta, Inc., Tokyo (JP)

(72) Inventors: Kazusei Takahashi, Nishinomiya (JP); Takehisa Yamaguchi, Ikoma (JP); Hirokazu Kubota, Otsu (JP)

(73) Assignee: Konica Minolta, Inc., Tokyo (JP)

( * ) Notice: Subject to any disclaimer, the term of this patent is extended or adjusted under 35 U.S.C. 154(b) by 304 days.

(21) Appl. No.: 15/619,529

(22) Filed: Jun. 11, 2017

(65) Prior Publication Data

US 2017/0359726 A1    Dec. 14, 2017

(30) Foreign Application Priority Data

Jun. 13, 2016    (JP) .................................. 2016-117075

(51) Int. Cl.
  *G06K 9/00*     (2006.01)
  *H04L 29/08*    (2006.01)
  *H04L 29/06*    (2006.01)
  *H04W 12/06*    (2009.01)

(52) U.S. Cl.
  CPC ........ *H04W 12/06* (2013.01); *G06K 9/00013* (2013.01); *G06K 9/00087* (2013.01); *H04L 63/083* (2013.01); *H04L 63/0861* (2013.01); *H04L 67/12* (2013.01)

(58) Field of Classification Search
  CPC ....... H04W 12/06; H04W 12/12; H04W 4/80; H04L 63/08; H04L 63/0861; H04L 63/083; H04L 67/12; G06K 9/00087; G06K 9/00013
  See application file for complete search history.

(56) References Cited

U.S. PATENT DOCUMENTS

| | | | |
|---|---|---|---|
| 9,712,552 B2 * | 7/2017 | Bailey, Jr. ........... | H04L 63/0861 |
| 2011/0138187 A1 * | 6/2011 | Kaga ....................... | G06F 21/32 |
| | | | 713/186 |
| 2012/0005736 A1 * | 1/2012 | Takahashi ............... | G06F 21/32 |
| | | | 726/7 |
| 2012/0098948 A1 * | 4/2012 | Lee ...................... | A61B 5/1172 |
| | | | 348/77 |
| 2012/0294196 A1 * | 11/2012 | Gorti ................... | H04L 65/1016 |
| | | | 370/259 |
| 2013/0207779 A1 * | 8/2013 | Uno ........................ | G06F 21/32 |
| | | | 340/5.82 |

(Continued)

FOREIGN PATENT DOCUMENTS

JP    2011-071593 A    4/2011
JP    2014-082716 A    5/2014

*Primary Examiner* — Nelson S. Giddins
(74) *Attorney, Agent, or Firm* — Baker Hostetler

(57) ABSTRACT

An information processing terminal capable of communicating with a sensor terminal including a first biological sensor which measures a first type of biological information includes: a reception unit receiving a measurement result of the first biological sensor from the sensor terminal; a second biological sensor measuring the first type of biological information; and a control unit authenticating the sensor terminal and establishing connection with the sensor terminal when the measurement result of the first biological sensor satisfies a predetermined condition on a measurement result of the second biological sensor.

14 Claims, 9 Drawing Sheets

(56) References Cited

U.S. PATENT DOCUMENTS

| | | | | |
|---|---|---|---|---|
| 2014/0112227 A1* | 4/2014 | Hasegawa | ............... | H04W 4/21 |
| | | | | 370/311 |
| 2014/0245395 A1* | 8/2014 | Hulse | ................... | H04L 63/101 |
| | | | | 726/4 |
| 2014/0379273 A1* | 12/2014 | Petisce | ................... | G06F 19/00 |
| | | | | 702/19 |
| 2015/0010217 A1* | 1/2015 | Aoki | .................. | G06K 9/00006 |
| | | | | 382/124 |
| 2015/0347816 A1* | 12/2015 | Boshra | ............... | G06K 9/00026 |
| | | | | 382/124 |
| 2016/0006732 A1* | 1/2016 | Smith | .................... | G06F 21/32 |
| | | | | 726/6 |
| 2016/0174025 A1* | 6/2016 | Chaudhri | ............... | H04B 1/385 |
| | | | | 455/41.1 |
| 2016/0234206 A1* | 8/2016 | Tunnell | ................... | H04W 4/70 |
| 2016/0247337 A1* | 8/2016 | Webber | .............. | G06K 7/10297 |
| 2019/0034697 A1* | 1/2019 | Matsunami | ........ | G06K 9/00026 |

\* cited by examiner

| | | |
|---|---|---|
| AUTHENTICATION METHOD | | ⟨COMPARISON DETERMINATION WITH VITAL DATA⟩ |
| OPERATION STATUS | | OPERATING [VERIFYING AUTHENTICATION] |
| MAXIMUM NUMBER OF CONCURRENT CONNECTIONS OF AUTHENTICATED TERMINAL | | ONE |
| IDENTIFICATION INFORMATION OF AUTHENTICATED TERMINAL | FIRST TERMINAL | — |
| | SECOND TERMINAL | — |
| | THIRD TERMINAL | — |
| SETTING INFORMATION FOR MEASURING VITAL DATA IN AUTHENTICATION | NUMBER OF TIMES OF RE-MEASUREMENT | ⟨3 TIMES⟩ |
| | NUMBER OF TIMES OF MEASUREMENT | ⟨10 TIMES⟩ |
| | MEASUREMENT INTERVAL | ⟨6 SECONDS⟩ |
| | TYPE OF MEASUREMENT DATA | PULSE WAVE |
| INFORMATION RELATED TO COMPARISON METHOD OF VITAL DATA | NAME OF MAIN TERMINAL | TERMINAL A [S/N: ◇◇◇◇◇◇◇] |
| | NUMBER OF TIMES OF COMPARISON | SAME AS NUMBER OF TIMES OF MEASUREMENT |
| | CONGRUITY DETERMINATION CRITERIA (CONGRUITY ERROR RANGE AND NUMBER OF CONGRUITIES) | DIFFERENCE OF MEASUREMENT DATA: WITHIN ⟨±5%⟩ CONGRUENT POINTS: EQUAL TO OR MORE THAN ⟨7⟩ |
| | RE-MEASUREMENT CRITERIA (NUMBER OF CONGRUITIES) | CONGRUENT POINTS: EQUAL TO OR MORE THAN ⟨3⟩ AND LESS THAN ⟨7⟩ |
| | NOTIFICATION CRITERIA FOR INCONGRUITY ERROR (REFERENCE VALUE WITHOUT RE-MEASUREMENT) | CONGRUENT POINTS: LESS THAN ⟨3⟩ |
| | PRESENCE OR ABSENCE OF OFFSET TO MEASURED VALUE WHEN DETERMINED AS CONGRUITY | ⟨PERFORM ONLY IN RE-MEASUREMENT⟩ |

INFORMATION PROCESSING TERMINAL, INFORMATION PROCESSING SYSTEM, PROGRAM, AND CONTROL METHOD

This application claims priority under 35 U.S.C. § 119 to Japanese Patent Application No. 2016-117075, which was filed on Jun. 13, 2016 and which is hereby incorporated by reference in its entirety.

BACKGROUND OF THE INVENTION

Field of the Invention

The present disclosure relates to control of an information processing terminal, and more particularly relates to control of an information processing terminal which performs wireless communication.

Description of the Related Art

According to the recent trend of Internet on Things (IoT), popularization of wireless communication apparatuses has been promoted. While a wireless communication apparatus can easily form a network without a physical cable, the apparatus can be affected by spoofing of a malicious third person.

As a technique for suppressing such spoofing, for example, JP 2014-082716 A discloses a configuration which reduces the risk of spoofing connection without changing a hardware configuration increasing battery consumption. More specifically, in the technique, when first identification data (a media access control (MAC) address) contained in a first pairing request packet and second identification data contained in a second pairing request packet satisfy a predetermined condition, a terminal which has wirelessly transmitted the second pairing request packet is to be registered as a terminal which performs wireless communication of data in an upper layer than a data link layer.

Furthermore, as a technique for safely duplicating information, for example, JP 2011-071593 A discloses a mobile information terminal system which duplicates a program for a master mobile information terminal in another mobile information terminal without a duplicating device. More specifically, the mobile information terminal system wirelessly mutually connects, through a local area network (LAN), to the other mobile information terminal paired through authentication by a public key encryption system with a digital certificate, and performs communication by a common key encryption system by distributing a common encryption key by the public key encryption system.

Moreover, as a technique relating to another security communication, a method in which authentication is performed while the buttons provided on terminals which mutually perform wireless communication are simultaneously being pressed, and connection is performed between a pair of authenticated terminals is also known.

However, the techniques disclosed in JP 2014-082716 A and JP 2011-071593 A can be affected by spoofing of a malicious third person when authentication information such as key information or input information is stolen. Furthermore, authentication information is normally constituted so as to be complicated in terms of ensuring security, and it is difficult for a user to remember the information. Thus, the user needs to manage the authentication information with a memorandum or the like. However, in terms of security, it is undesirable to leave authentication information in a memorandum or the like.

Furthermore, the method in which authentication is performed while the buttons provided on terminals which mutually perform wireless communication are simultaneously being pressed can be affected by spoofing based on wireless radio waves output from the apparatuses while the buttons are being pressed.

SUMMARY OF THE INVENTION

The present disclosure has been made to solve the above problems, and an object of the present disclosure in an aspect is to provide an information processing terminal which suppresses spoofing while convenience of a user is secured.

To achieve the abovementioned object, according to an aspect, there is provided an information processing terminal capable of communicating with a sensor terminal including a first biological sensor which measures a first type of biological information, and the information processing terminal reflecting one aspect of the present invention comprises: a reception unit configured to receive a measurement result of the first biological sensor from the sensor terminal; a second biological sensor configured to measure the first type of biological information; and a control unit configured to authenticate the sensor terminal and establish connection with the sensor terminal when the measurement result of the first biological sensor satisfies a predetermined condition on a measurement result of the second biological sensor.

The control unit is preferably configured to determine that the measurement result of the first biological sensor satisfies the predetermined condition when a ratio of congruity of measurement results of the first and second biological sensors in a predetermined period is equal to or more than a predetermined value.

The information processing terminal preferably further comprises: an operation acceptance unit configured to accept input of information. The control unit is preferably configured to transmit, to the sensor terminal, a request signal requesting measurement of the first type of biological information with the first biological sensor and transmission of a measurement result of the biological information in response to input of predetermined information to the operation acceptance unit.

The control unit is preferably configured to re-transmit the request signal to the sensor terminal up to the predetermined number of times when determining that the measurement result of the first biological sensor transmitted in response to the transmission of the request signal does not satisfy the predetermined condition.

The control unit is preferably configured to determine whether the measurement result of the first biological sensor satisfies the predetermined condition by calculating a first mean value which is a mean value of a plurality of measurement results with the first biological sensor transmitted in response to the transmission of the request signal and a second mean value which is a mean value of a plurality of measurement results with the second biological sensor corresponding to the respective plurality of measurement results with the first biological sensor, and determining whether the first mean value satisfies the predetermined condition on the second mean value.

The control unit is preferably configured to further transmit, to the sensor terminal, a synchronization signal designating a timing to perform measurement with the first biological sensor. The second biological sensor is preferably configured to measure the first type of biological information at the timing in accordance with the synchronization signal.

The control unit is preferably configured to notify of an error when determining that the measurement result of the first biological sensor does not satisfy the predetermined condition.

The control unit is preferably configured to communicate with the sensor terminal by short-range wireless communication at least until authenticating the sensor terminal.

The control unit is preferably configured to verify whether transmission of data to the sensor terminal has succeeded by comparing the data transmitted to the sensor terminal with at least a part of the data returned from the sensor terminal after authenticating the sensor terminal and establishing the connection with the sensor terminal.

The information processing terminal preferably further comprises: a storage unit configured to store data to be transmitted to the sensor terminal. The control unit is preferably configured to delete, in the storage unit, the data transmitted to the sensor terminal when verifying that the transmission of the data to the sensor terminal has succeeded.

The information processing terminal is preferably configured to be mountable on a human body.

To achieve the abovementioned object, according to an aspect, an information processing system reflecting one aspect of the present invention comprises: a first information processing terminal; and a second information processing terminal, wherein the first information processing terminal includes: a first biological sensor configured to measure a first type of biological information; a transmission unit configured to transmit a measurement result of the first biological sensor to the second information processing terminal, and the second information processing terminal includes: a reception unit configured to receive the measurement result of the first biological sensor from the first information processing terminal; a second biological sensor configured to measure the first type of biological information; and a control unit configured to authenticate the first information processing terminal and establish connection with the first information processing terminal when the measurement result of the first biological sensor satisfies a predetermined condition on a measurement result of the second biological sensor.

The first information processing terminal and the second information processing terminal are preferably configured to be mountable on a human body.

The second information processing terminal preferably further comprises an information unit configured to inform a user of information. The control unit is preferably configured to inform, through the information unit, the user of an instruction for replacing mounting positions of the first information processing terminal and the second information processing terminal when determining that the measurement result of the first biological sensor does not satisfy the predetermined condition.

The control unit is preferably configured to determine whether the measurement result of the first biological sensor satisfies the predetermined condition by calculating a first mean value which is a mean value of measurement results of the first biological sensor and a second mean value which is a mean value of measurement results of the second biological sensor before and after informing the user of the instruction, and determining whether the first mean value satisfies the predetermined condition on the second mean value.

To achieve the abovementioned object, according to an aspect, there is provided a non-transitory recording medium storing a computer readable program which is executed by a computer of an information processing terminal including a biological sensor which measures a first type of biological information and to communicate with a sensor terminal which measures the first type of biological information, and the program reflecting one aspect of the present invention causes the computer to execute the steps of: receiving a measurement result of the first type of biological information from the sensor terminal; measuring the first type of biological information; determining whether the measurement result received from the sensor terminal satisfies a predetermined condition on a measurement result of the biological information in the measuring; and authenticating the sensor terminal and establishing connection with the sensor terminal when it is determined that the predetermined condition is satisfied.

To achieve the abovementioned object, according to an aspect, there is provided a control method of an information processing terminal including a biological sensor which measures a first type of biological information for communicating with a sensor terminal which measures the first type of biological information, and the control method reflecting one aspect of the present invention comprises the steps of: receiving a measurement result of the first type of biological information from the sensor terminal; measuring the first type of biological information; determining whether the measurement result received from the sensor terminal satisfies a predetermined condition on a measurement result of the biological information in the measuring; and authenticating the sensor terminal and establishing connection with the sensor terminal when it is determined that the predetermined condition is satisfied.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 6 is a table explaining an authentication table for storing information on authentication processing according to an embodiment;

DESCRIPTION OF THE PREFERRED EMBODIMENTS

Figure 1:
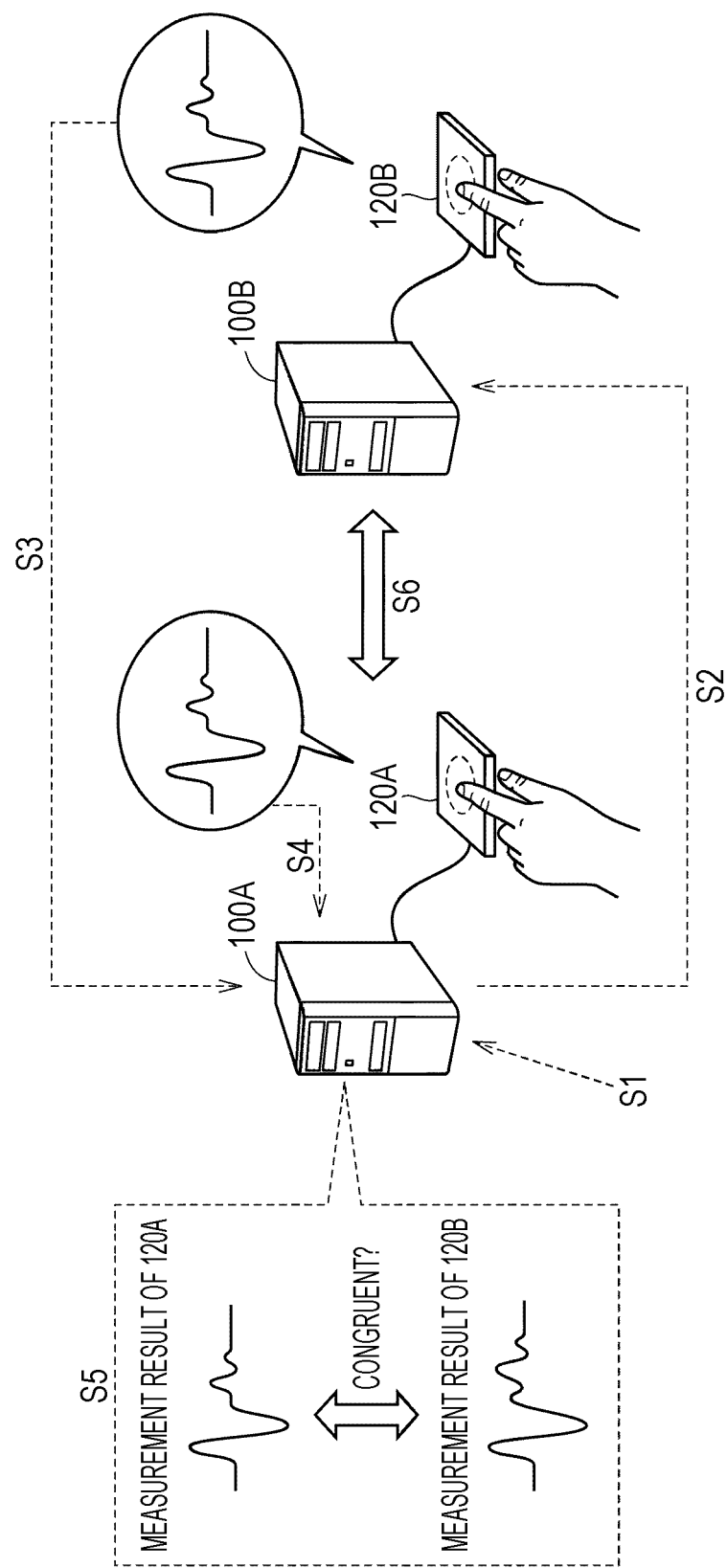
FIG. 1 is a diagram briefly explaining operation of an information processing system according to an embodiment.

Hereinafter, an embodiment of the present invention will be described in detail with reference to the drawings. However, the scope of the invention is not limited to the illustrated examples. Note that, the same reference sign is assigned to the same parts or equivalent parts in the drawings, and the description thereof is not repeated.

SUMMARY

FIG. 1 is a diagram briefly explaining operation of an information processing system 1 according to an embodiment. As illustrated in FIG. 1, the information processing system 1 includes an information processing terminal 100A and an information processing terminal 100B. The terminal 100A and the terminal 100B respectively have a biological sensor 120A and a biological sensor 120B for measuring biological information.

In the following description, the control for authenticating the terminal 100B in order for the information processing terminal 100A to communicate with the information processing terminal 100B is described.

In step S1, a user inputs an instruction to the information processing terminal 100A to communicate with the information processing terminal 100B.

In step S2, the information processing terminal 100A transmits a signal for performing mutual authentication to the information processing terminal 100B in response to the input of the instruction from the user.

In step S3, the information processing terminal 100B measures biological information of the user with the biological sensor 120B based on the signal input from the information processing terminal 100A, and transmits the measurement result to the information processing terminal 100A.

In step S4, the information processing terminal 100A measures biological information of the user with the biological sensor 120A. Note that, the type of the biological information measured with the biological sensor 120A is the same as the type of the biological information measured with the biological sensor 120B. Furthermore, in steps S3 and S4, the biological sensors 120A and 120B measure the biological information of the same user.

In step S5, the information processing terminal 100A determines whether the measurement result of the biological sensor 120B satisfies the predetermined condition on the measurement result of the biological sensor 120A (for example, whether the measurement results of the two terminals are congruent). In step S6, the information processing terminal 100A authenticates the information processing terminal 100B and establishes the connection with the information processing terminal 100B when determining that the measurement result of the biological sensor 120B satisfies the condition in step S5.

After authenticating the information processing terminal 100B, the information processing terminal 100A transmits and receives predetermined information (for example, secret information).

According to the above description, to establish the communication between the information processing terminals 100A and 100B, the user is only required to measure the user's own biological information with the biological sensors equipped with the information processing terminals between which the establishment of the communication is desired. Thus, the user neither needs to memorize complicated authentication information (password) nor leave the authentication information in a memorandum or the like. Consequently, the information processing system according to the present embodiment has higher security than a conventional system.

Furthermore, the information processing system according to the present embodiment uses, as authentication information between information processing terminals, biological information which is extremely difficult for a malicious third person to duplicate or acquire. Consequently, the information processing system according to the present embodiment can suppress spoofing more than a conventional system. The configuration and control of the information processing system are detailedly described below.

[Hardware Configurations of Information Processing Terminals 100A and 100B]

Figure 2:
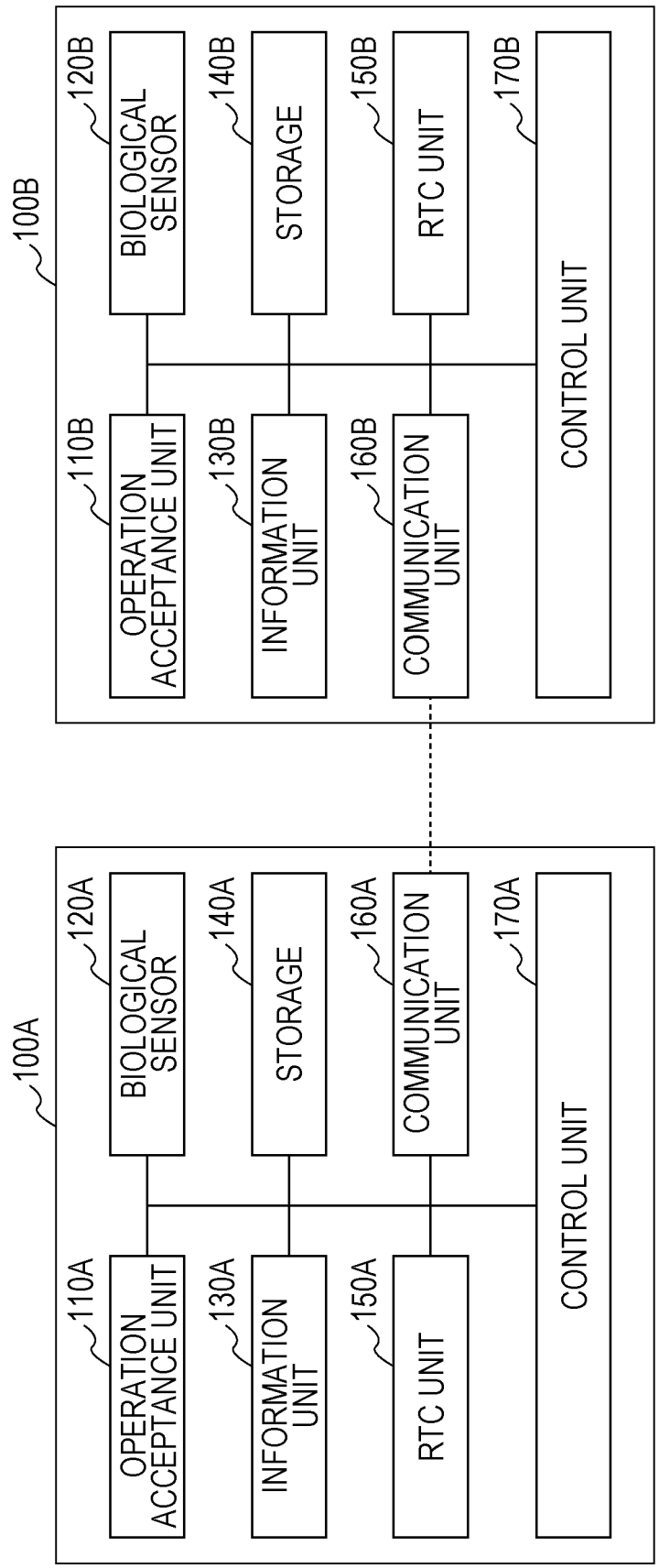
FIG. 2 is a block diagram explaining a hardware configuration of an information processing terminal according to an embodiment.

FIG. 2 is a block diagram explaining hardware configurations of the information processing terminals 100A and 100B according to the present embodiment. As illustrated in FIG. 2, the information processing terminal 100A includes, as main constituent elements, an operation acceptance unit 110A, a biological sensor 120A, an information unit 130A, a storage 140A, a real time clock (RTC) unit 150A, a communication unit 160A, and a control unit 170A.

The operation acceptance unit 110A accepts the operation of the user to the information processing terminal 100A. For example, the operation acceptance unit 110A is implemented by a mouse, a keyboard, a hardware button, a touch panel, or other input devices.

The biological sensor 120A acquires biological information of the user. As an example, the biological sensor 120A measures pulse waves. Note that, biological information to be measured with the biological sensor 120A is not limited to pulse waves, and in another aspect, a heart rate, blood pressure, body temperature, parasympathetic nerve activity, sympathetic nerve activity, an activity amount (acceleration), an electrocardiogram, body movement, percutaneous oxygen saturation (SpO2), a pulse wave propagation time, or the like may be measured. Preferably, biological information to be measured with the biological sensor 120A is information which varies with time. This makes it difficult for a malicious third person to acquire biological information.

The information unit 130A informs the user of information and is implemented by, for example, a display. Note that, in another aspect, the information unit 130A may inform the user of information with vibration by a vibrator or sounds by a speaker.

The storage 140A stores the setting of the information processing terminal 100A, measurement results of the biological sensor 120A, and the like. The RTC unit 150A measures time and keeps measuring time with a built-in battery although the power to the information processing terminal 100A is stopped.

The communication unit 160A is configured so as to be communicable with the information processing terminal 100B with wireless communication. For example, the communication unit 160A communicates with the information processing terminal 100B in accordance with the Near Field Communication (NFC) standard. Note that, in another aspect, the communication unit 160A may communicate in accordance with a wireless communication system such as an infrared ray system, the Bluetooth (registered trademark) standard, the Wireless Fidelity (WiFi) standard, and a contactless integrated circuit (IC) card using electromagnetic induction. It is preferable that the communication unit 160A communicates in accordance with the standard of short-range wireless communication in which the communication range is relatively short (for example, one meter to several centimeters). Thus, it is possible to suppress spoofing of a malicious third person.

The control unit 170A controls the entire operation of the information processing terminal 100A. The control unit 170A is configured by, for example, at least one integrated circuit. The integrated circuit is configured by, for example, at least one central processing unit (CPU), at least one application specific integrated circuit (ASIC), at least one field programmable gate array (FPGA), a combination thereof, or the like.

Figure 3:
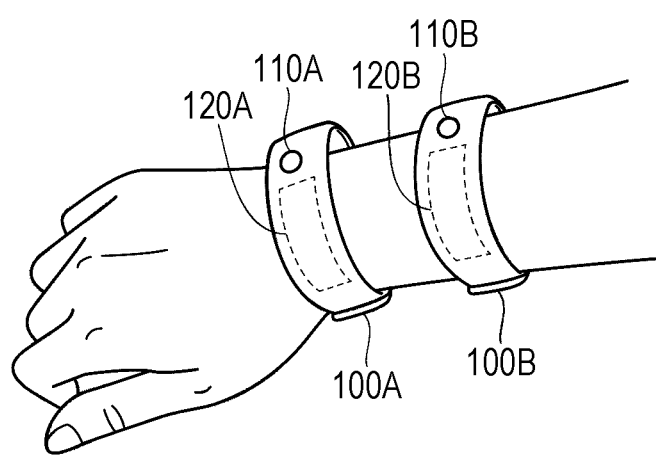
FIG. 3 is a diagram illustrating a specific example of an information processing terminal according to an embodiment.
Figure 4:
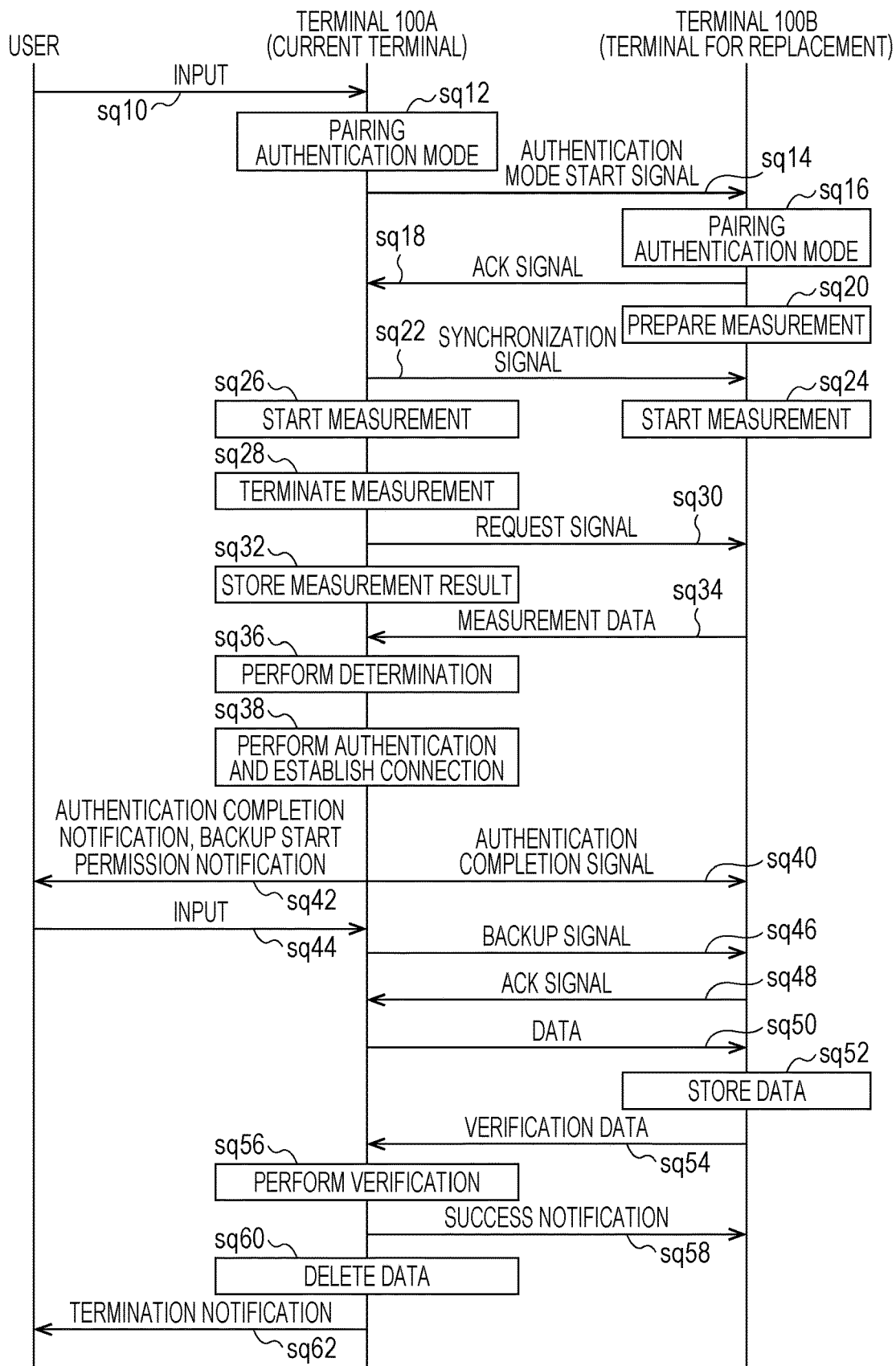
FIG. 4 is a sequence diagram explaining control for performing mutual authentication of information processing terminals according to an embodiment.

The basic configurations of the information processing terminals 100A and 100B are the same, and the description of the information processing terminal 100B is not repeated. Note that, in another aspect, the information processing terminal 100B may have a configuration different from the information processing terminal 100A, and is only required to include, at least, the biological sensor 120B and a communication unit 160B. In other words, in an aspect, the information processing terminal 100B functions as a sensor terminal which measures biological information (pulse wave) of the user with the biological sensor 120B and transmits the measurement result to the information processing terminal 100A. With reference to FIGS. 3 and 4, the control of the information processing terminal 100A for authenticating the information processing terminal 100B is described below.

[Authentication Control]

FIG. 3 illustrates a specific example of the information processing terminals 100A and 100B according to the present embodiment. As illustrated in FIG. 3, the information processing terminals 100A and 100B are wristband-type wearable terminals which are mountable on a user. Note that, in another aspect, each of the information processing terminals 100A and 100B can be a mobile computer, a tablet computer, a mobile device (for example, a smartphone or a PDA), a desktop computer, or arbitrary other devices having appropriate processing capability, communication capability, and memory.

In FIG. 3, the operation acceptance units 110A and 110B each include at least one hardware button. The biological sensors 120A and 120B each measure pulse waves with, for example, a light-reflective sensor disposed on the inner circumferential surface of each wristband-type terminal.

FIG. 4 is a sequence diagram explaining the control of the information processing terminal 100A according to the present embodiment for authenticating the information processing terminal 100B. In FIG. 4, the user transmits the information stored in the storage 140A of the information processing terminal 100A to the information processing terminal 100B. As a situation of this case, there can be a case in which, for example, since the remaining capacity of a battery (not illustrated) for driving the information processing terminal 100A is low and the information processing terminal 100B needs to be used, the measurement result, setting information, and the like of the information processing terminal 100A are desired to be transferred to the information processing terminal 100B. As another situation, there can be a case in which the information processing terminal 100B is a successor model of the information processing terminal 100A and the measurement results, setting information, and the like of the information processing terminal 100A are desired to be transferred. Other examples of the information stored in the storage 140A can be password data, a social security/tax number (individual number), an employee number, server information having an access right, and the like.

In sequence sq10, the user inputs, to the operation acceptance unit 110A of the currently using information processing terminal 100A, pre-specified operation for transmitting the information stored in the storage 140A to the information processing terminal 100B for replacement.

In sequence sq12, the information processing terminal 100A starts an authentication mode for authenticating the information processing terminal 100B in response to the input from the user. In sequence sq14, the information processing terminal 100A transmits an authentication mode start signal to the information processing terminal 100B.

In sequence sq16, the information processing terminal 100B starts the authentication mode in response to the input of the authentication mode start signal from the information processing terminal 100A. Note that, in another aspect, the information processing terminal 100A may not transmit the authentication mode start signal to the information processing terminal 100B in sequence sq14. Specifically, the information processing terminal 100B may start the authentication mode by operating the operation acceptance unit 110B of the information processing terminal 100B by the user.

In sequence sq18, the information processing terminal 100B returns, to the information processing terminal 100A, an acknowledgment (ACK) signal informing that the authentication mode start signal has been received.

In sequence sq20, the information processing terminal 100B starts the preparation for measuring biological information (pulse wave) with the biological sensor 120B.

In sequence sq22, the information processing terminal 100A transmits a synchronization signal to the information processing terminal 100B in response to the reception of the ACK signal from the information processing terminal 100B. Based on the synchronization signal, the measurement timing of the biological information (pulse wave) with the biological sensor 120A is to be synchronized with the measurement timing with the biological sensor 120B. For example, the information processing terminal 100A generates the synchronization signal including a measurement start time, and a measurement interval, and the number of times of measurement referring to the time counted by the RTC unit 150A. Note that, in another aspect, the information processing terminal 100A may transmit the synchronization signal including the current time of the RTC unit 150A to synchronize the current time of the RTC unit 150A with the current time of the RTC unit 150B. The measurement interval and the number of times of measurement included in the synchronization signal are specified in an authentication table Ta1 to be described later.

In sequence sq24, the information processing terminal 100B starts measurement of the pulse wave of the user in accordance with the synchronization signal input from the information processing terminal 100A. Furthermore, in sequence sq26, the information processing terminal 100A also starts measurement of the pulse wave of the user in accordance with the synchronization signal transmitted to the information processing terminal 100B.

In sequence sq28, the information processing terminal 100A terminates the measurement of the pulse wave. In sequence sq30, the information processing terminal 100A transmits, to the information processing terminal 100B, a request signal for requesting transmission of the measurement result of the biological sensor 120B. In sequence sq32, the information processing terminal 100A stores the measurement result of the biological sensor 120A in the storage 140A.

In sequence sq34, the information processing terminal 100B transmits the measurement result of the biological sensor 120B to the information processing terminal 100A in response to the input of the request signal from the information processing terminal 100A.

In sequence sq36, the information processing terminal 100A determines whether the measurement result of the biological sensor 120A satisfies the predetermined condition on the measurement result of the biological sensor 120B. The details of the determination method are described later.

In sequence sq38, when determining that the predetermined condition is satisfied in sequence sq36, the information processing terminal 100A authenticates the information processing terminal 100B and establishes the connection with the information processing terminal 100B.

In sequence sq40, the information processing terminal 100A transmits an authentication completion signal informing that the authentication has been completed (succeeded) to the information processing terminal 100B. In sequence sq42, the information processing terminal 100A displays, on the information unit 130A (display), the completion of the authentication and a message for confirming whether the information stored in the storage 140A is to be duplicated in the information processing terminal 100B.

In sequence sq44, the user inputs, to the information processing terminal 100A through the operation acceptance unit 110A, the permission to duplicate the information stored in the storage 140A in the information processing terminal 100B.

In sequence sq46, the information processing terminal 100A transmits a backup signal informing that backup is started to the information processing terminal 100B in response to the input from the user.

In sequence sq48, the information processing terminal 100B returns an ACK signal informing that the backup signal has been received to the information processing terminal 100A.

In sequence sq50, the information processing terminal 100A transmits the information stored in the storage 140A to the information processing terminal 100B through the communication unit 160A. Note that, in another aspect, the information processing terminals 100A and 100B may include, separately from the communication units 160A and 160B, other communication interfaces having higher bit rates than the communication units 160A and 160B. In this configuration, the information processing terminal 100A may use another communication interface to transmit the secret information in sequence sq50. Another communication interface can be, for example, the Bluetooth (registered trademark) standard. With this configuration, it is possible to efficiently perform transmission/reception of information by using a communication system having a small communication range such as the NFC standard to prevent spoofing until the information processing terminals 100A and 100B are mutually authenticated, and by using a communication system having a higher bit rate after the authentication.

In sequence sq52, the information processing terminal 100B stores the information received from the information processing terminal 100A in a storage 140B. In sequence sq54, the information processing terminal 100B returns at least a part of the information received from the information processing terminal 100A to the information processing terminal 100A as verification data. Note that, in another aspect, the information processing terminal 100B may return a cyclic redundancy check (CRC) signal related to the information received from the information processing terminal 100A to the information processing terminal 100A.

In sequence sq56, the information processing terminal 100A verifies whether the verification data returned from the information processing terminal 100B is congruent with the information transmitted to information processing terminal 100B. In sequence sq58, when verifying that the verification data returned from the information processing terminal 100B is congruent with the information transmitted to the information processing terminal 100B, the information processing terminal 100A transmits a success notification informing that the backup has succeeded to the information processing terminal 100B.

In sequence sq60, the information processing terminal 100A deletes (formats) the information stored in the storage 140A and transmitted to the information processing terminal 100B in response to the success of the verification. Thus, the information processing system 1 can delete the information which is stored in the information processing terminal 100A but cannot be used by the user, and ensure the security.

In sequence sq62, the information processing terminal 100A displays, on the information unit 130A, the termination of a series of data transfer processing including the deletion of the information stored in the storage 140A.

Note that, the above series of sequences is not necessarily performed in the order shown in FIG. 4. For example, the processing orders of sequence sq12, sequence sq16, and sequence sq30 may be replaced with sequence sq14, sequence sq18, and sequence sq32 respectively. Furthermore, in another aspect, there can be a case in which backup (duplication) of the secret information stored in the information processing terminal 100A in the information processing terminal 100B is desired. In this case, the information processing terminal 100A may omit sequence sq60. Next, in the above series of the authentication processing, the processing in each of the information processing terminals 100A and 100B is described.

[Processing in Information Processing Terminal 100A]

Figure 5:
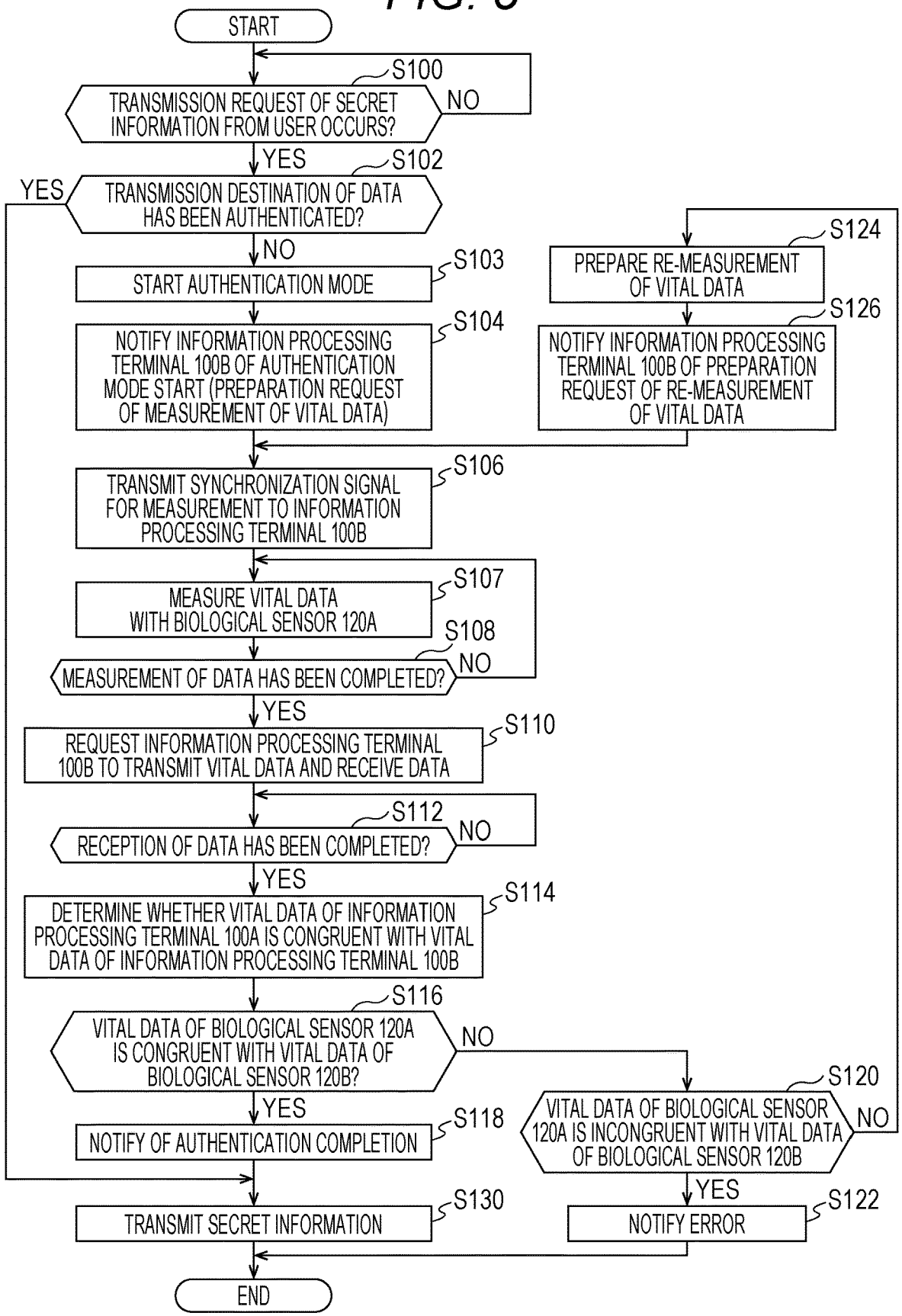
FIG. 5 is a flowchart explaining authentication processing in an information processing terminal according to an embodiment.

FIG. 5 is a flowchart explaining authentication processing in the information processing terminal 100A according to the present embodiment. The processing shown in FIG. 5 is performed by running a control program stored in the storage 140A by the control unit 170A. In another aspect, a part of or all the processing may be performed by a circuit element or other hardware.

In step S100, the control unit 170A determines whether a transmission request event of the secret information occurs. More specifically, the control unit 170A performs the determination based on the input to the operation acceptance unit 110A.

The secret information has enormous influences if leaked out, and can be, for example, password data, a social security/tax number (individual number), an employee number, server information having an access right, biological information (a measurement result of the biological sensor 120A), and the like.

The control unit 170A determines whether data which is the target of the transmission request event is the secret information based on the storage area of the data in the storage 140A (whether the data is stored in a particular folder or the like), security information attached to the data, or the like. With this configuration, when transmitting information having no influence if leaked out (information which is not the secret information), the information processing terminal 100A can transmit the information to the information processing terminal 100B without the authentication processing using the biological information.

When determining that the transmission request event of the secret information by the user has occurred (YES in step S100), the control unit 170A proceeds the processing to step S102. If not (NO in step S100), the control unit 170A returns the processing to step S100, and awaits the occurrence of the transmission request event of the secret information. In the processing shown in FIG. 5, it is assumed that, for example, the transmission request event by the user for transmitting the secret information to the information processing terminal 100B occurs in step S100.

In step S102, the control unit 170A determines whether the information processing terminal 100B which is the transmission destination of the secret information has been authenticated. More specifically, the control unit 170A determines whether the information processing terminal 100B has been authenticated referring to the authentication table Ta1 shown in FIG. 6.

FIG. 6 is a table explaining the authentication table Ta1 for storing information on the authentication processing according to the present embodiment. The authentication table Ta1 contains an authentication method, an operation status, the maximum number of concurrent connections of an authenticated terminal, identification information on the authenticated terminal, setting information on measurement of biological information (vital data) at the time of authentication, and information related to a comparison method of the biological information, and is stored in the storage 140A. The operation status indicates that the authentication processing has been performed.

Note that, in another aspect, each items of information may be contained in an independent table. In the example shown in FIG. 6, the values in < > (angle brackets) are changeable by operating the operation acceptance unit 110A by a user or an administrator. In an aspect, the information processing terminal 100A can perform an authentication method in accordance with the conventional secure simple pairing (SSP) in addition to the above authentication method using the biological information, and may be configured so that either authentication method can be selected by the user.

The control unit 170A checks the identification information of the authenticated terminal in the authentication table Ta1 in step S102, and determines whether the identification information of the information processing terminal 100B is registered. The identification information can be, for example, a media access control (MAC) address set to the communication unit 160B, the serial number of the information processing terminal 100B, and the like.

When determining that the information processing terminal 100B which is the transfer destination of the secret information has been authenticated (YES in step S102), the control unit 170A proceeds the processing to step S130. If not (NO in step S102), the control unit 170A proceeds the processing to step S103.

In step S103, the control unit 170A starts the authentication mode for authenticating the information processing terminal 100B. In step S104, the control unit 170A transmits the authentication mode start signal requesting the start of the authentication mode to the information processing terminal 100B. The authentication mode start signal substantially functions as a signal requesting the information processing terminal 100B to measure biological information (pulse wave) of the user with the biological sensor 120B.

In step S106, the control unit 170A generates the synchronization signal referring to the authentication table Ta1 in response to the reception of the ACK signal from the information processing terminal 100B, and transmits the synchronization signal to the information processing terminal 100B. In the example shown in FIG. 6, the control unit 170A transmits, to the information processing terminal 100B, the synchronization signal including a measurement start time and information in which the measurement is performed at intervals of six seconds and ten times in total.

In step S107, the control unit 170A measures biological information (pulse wave) with the biological sensor 120A under the same condition as the synchronization signal transmitted to the information processing terminal 100B.

In step S108, the control unit 170A determines whether the measurement of the biological information with the biological sensor 120A has been terminated. In the example shown in FIG. 6, the control unit 170A determines that the measurement of the biological information has been terminated when ten measurement results in total are acquired with the biological sensor 120A.

When determining that the measurement of the biological information with the biological sensor 120A has been terminated (YES in step S108), the control unit 170A proceeds the processing to step S110. If not (NO in step S108), the control unit 170A returns the processing to step S107.

In step S110, the control unit 170A transmits the request signal requesting the measurement result of the biological sensor 120B to the information processing terminal 100B. Thereafter, the information processing terminal 100A receives the measurement result of the biological sensor 120B transmitted from the information processing terminal 100B.

In step S112, the control unit 170A determines whether the reception of the measurement result of the biological sensor 120B from the information processing terminal 100B has been completed. When determining that the reception has been completed (YES in step S112), the control unit 170A proceeds the processing to step S114. If not (NO in step S112), the control unit 170A awaits until the reception of the measurement result of the biological sensor 120B is completed.

Note that, in another aspect, when the control unit 170A cannot receive the measurement result from the information processing terminal 100B although a predetermined time passes after transmitting the request signal requesting the measurement result of the biological sensor 120B, the control unit 170A may transmit the signal requesting the measurement result again or notify the information unit 130A of the error.

In step S114, the control unit 170A determines whether the measurement result of the biological sensor 120B received from the information processing terminal 100B satisfies the predetermined condition on the measurement result of the biological sensor 120A. More specifically, the control unit 170A determines, in accordance with the determination criteria in the authentication table Ta1 shown in FIG. 6, whether the corresponding measurement results of the biological sensors 120A and 120B are congruent.

Figure 7:
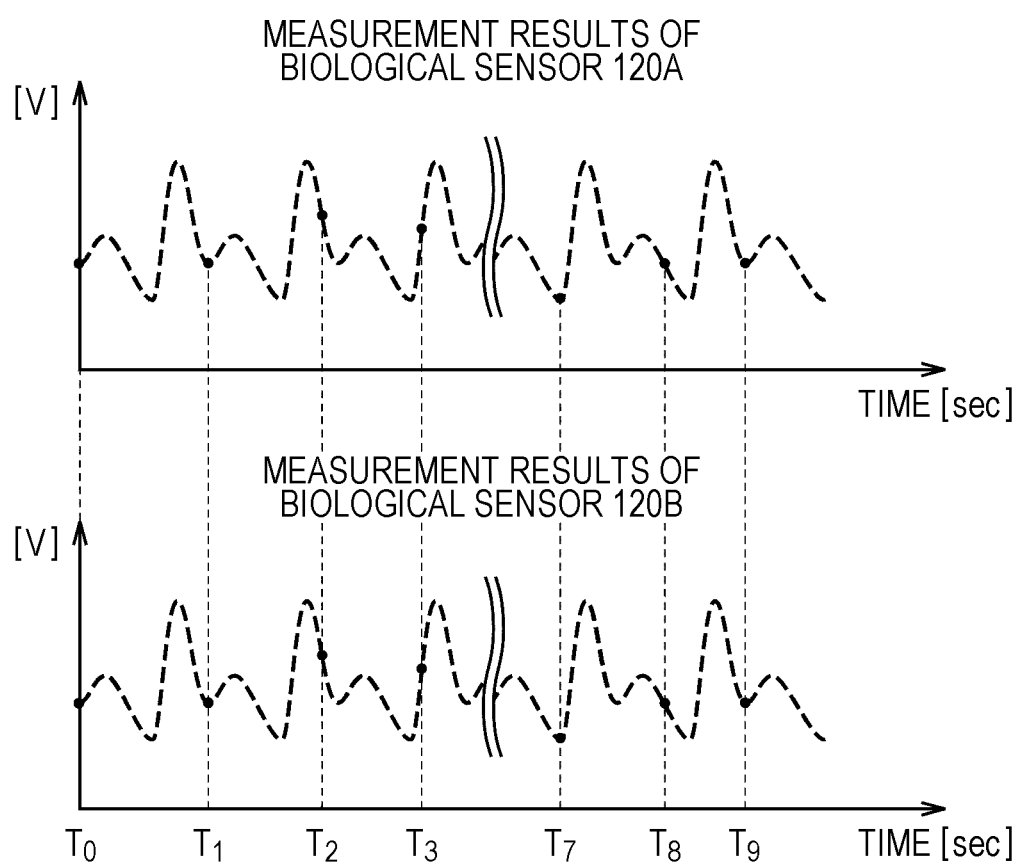
FIG. 7 is a diagram explaining comparison of measurement results of biological sensors according to an embodiment.

FIG. 7 is a diagram explaining the comparison of the measurement results of the biological sensors 120A and 120B according to the present embodiment. In the above example, the biological sensors 120A and 120B measure the pulse wave of the user. Note that, in the example of FIG. 7, the output of each of the biological sensors 120A and 120B is voltage indicating the ratio of reflected light to incident light.

The biological sensors 120A and 120B start the measure of the pulse wave from time T0 in accordance with the synchronization signal, and measure the pulse wave every 6 seconds at ten points of time T1, T2, T3, . . . T9.

In the determination example shown in FIG. 6, the control unit 170A compares each measurement result of the biological sensor 120A with each corresponding measurement result of the biological sensor 120B. When the difference between the measured value of the biological sensor 120A and the corresponding measured value of the biological sensor 120B is within 5%, the control unit 170A determines that these measurement results are congruent. For example, when the difference between the measured value of the biological sensor 120A and the measured value of the biological sensor 120B at time T1 is 3% of the measured value of the biological sensor 120A, the control unit 170A determines that the measurement results at time T1 are congruent.

With reference to FIG. 5 again, in step S116, the control unit 170A determines whether the measurement results of the biological sensors 120A and 120B are congruent. In the example shown in FIG. 6, when the number of congruent measurement results in the ten measurement results of each of the biological sensors 120A and 120B is equal to or more than seven, the control unit 170A determines that the measurement result of the biological sensor 120B satisfies the predetermined condition on the measurement result of the biological sensor 120A, that is, the measurement results of the biological sensors 120A and 120B are congruent.

When determining that the measurement results of the biological sensors 120A and 120B are congruent (YES in step S116), the control unit 170A proceeds the processing to step S118. If not (NO in step S116), the control unit 170A proceeds the processing to step S120.

In step S118, the control unit 170A authenticates the information processing terminal 100B and transmits the authentication (authentication success) to the information processing terminal 100B. Thereafter, in step S130, the control unit 170A transmits the secret information to the information processing terminal 100B.

In step S120, the control unit 170A determines whether the measurement results of the biological sensors 120A and 120B are incongruent. In the example shown in FIG. 6, when the number of congruent measurement results in the ten measurement results of each of the biological sensors 120A and 120B is less than three, the control unit 170A determines that the measurement results of the biological sensors 120A and 120B are incongruent.

When determining that the measurement results of the biological sensors 120A and 120B are incongruent (YES in step S120), the control unit 170A proceeds the processing to step S122. If not (NO in step S120), the control unit 170A proceeds the processing to step S124.

In step S122, the control unit 170A notifies the information unit 130A of an error indicating that the authentication of the information processing terminal 100B has failed.

In step S124, the processing for re-measuring the biological information (vital data) is performed. In step S126, the control unit 170A transmits, to the information processing terminal 100B, a signal requesting measurement of biological information of the user with the biological sensor 120B. In other words, in the example shown in FIG. 6, when the number of congruent measurement results in the ten measurement results of each of the biological sensors 120A and 120B is equal to or more than three and less than seven, the control unit 170A newly measures biological information and performs congruity/incongruity determination of the new biological information.

Note that, in the above example, the control unit 170A performs the processing so as to proceed from step S120 to step S124, but the processing order is not limited to this. In another aspect, the control unit 170A may have the maximum number of times of measurement of biological information as shown in FIG. 6. In this case, before the processing proceeds from step S120 to step S124, the control unit 170A may count the number of times of re-measurement and perform the processing in step S122 when determining that the number of counts reaches the predetermined number of times (three times in the example of FIG. 6).

Furthermore, in another aspect, to determine whether the measurement results are congruent, the control unit 170A may not determine whether the ratio of the congruent measurement results of the biological sensors 120A and 120B at a predetermined period is equal to or more than a predetermined value as described above, and may perform the determination based on other criteria. As other criteria, for example, the control unit 170A may determine whether the similarity calculated from the amplitudes, cycles, timings of inflection points in the measurement results of the biological sensors 120A and 120B is equal to or more than a predetermined value.

Next, data correction for determining congruity/incongruity of the measurement results of the biological sensors 120A and 120B is described.

The measurement results of the biological sensors 120A and 120B can vary due to the degree of contact between each sensor and the user. Thus, in an aspect, when the measurement results are incongruent (YES in step S120), the control unit 170A performs the congruity/incongruity determination by comparing the mean value of the measurement results of the biological sensor 120A (hereinafter, referred to as a first mean value) with the mean value of the measurement results of the biological sensor 120B (hereinafter, referred to as a second mean value).

For example, when the congruity/incongruity determination of the measurement results is performed twice, the control unit 170A determines whether the mean value of the first and the second measurement results of the biological sensor 120A are congruent with the mean value of the first and the second measurement results of the biological sensor 120B. This determination criterion is the same as the first time.

According to the above, although the measurement results vary due to some factor, the control unit 170A can perform the congruity/incongruity determination using the mean values the variation of which is suppressed as the number of times of re-measurement is increased.

In another aspect, when the measurement results are not congruent (YES in step S120), the control unit 170A may perform offset correction based on the difference between the first mean value and the second mean value. For example, when the congruity/incongruity determination of the measurement results is performed three times, the control unit 170A calculates the first mean value and the second mean value based on the first to third measurement results, and calculates the difference value obtained by subtracting the first mean value from the second mean value. Next, the control unit 170A performs the correction in which the difference value is added to the third measurement result of the biological sensor 120A. The control unit 170A performs the congruity/incongruity determination by comparing the corrected measurement result of the biological sensor 120A and the third measurement result of the biological sensor 120B.

According to the above, the control unit 170A can determine whether the measurement results of the biological sensors 120A and 120B are congruent while suppressing a manufacturing error or a measurement error caused by the degree of contact between each sensor and the user.

Incidentally, the measurement result of biological information can vary according to a measuring position. For example, the value of blood pressure measured at a measuring position lower than the heart becomes higher than the actual value. Thus, in yet another aspect, when the measurement results are incongruent (YES in step S120), the control unit 170A may display an instruction for replacing the mounting positions of the information processing terminals 100A and 100B on the information unit 130A. In this configuration, the control unit 170A uses the mean value of the measurement result before the measurement positions are replaced and the measurement result after the measurement positions are replaced to perform the congruity/incongruity determination. In other words, the control unit 170A performs the determination using the mean value of the measurement results before and after the instruction for replacing the mounting positions of the information processing terminals 100A and 100B is displayed on the information unit 130A.

According to the above, the control unit 170A can perform the congruity/incongruity determination based on the mean value of the measurement results the influence of the measuring position to which is suppressed.

[Functional Configuration of Control Unit 170A]

Figure 8:
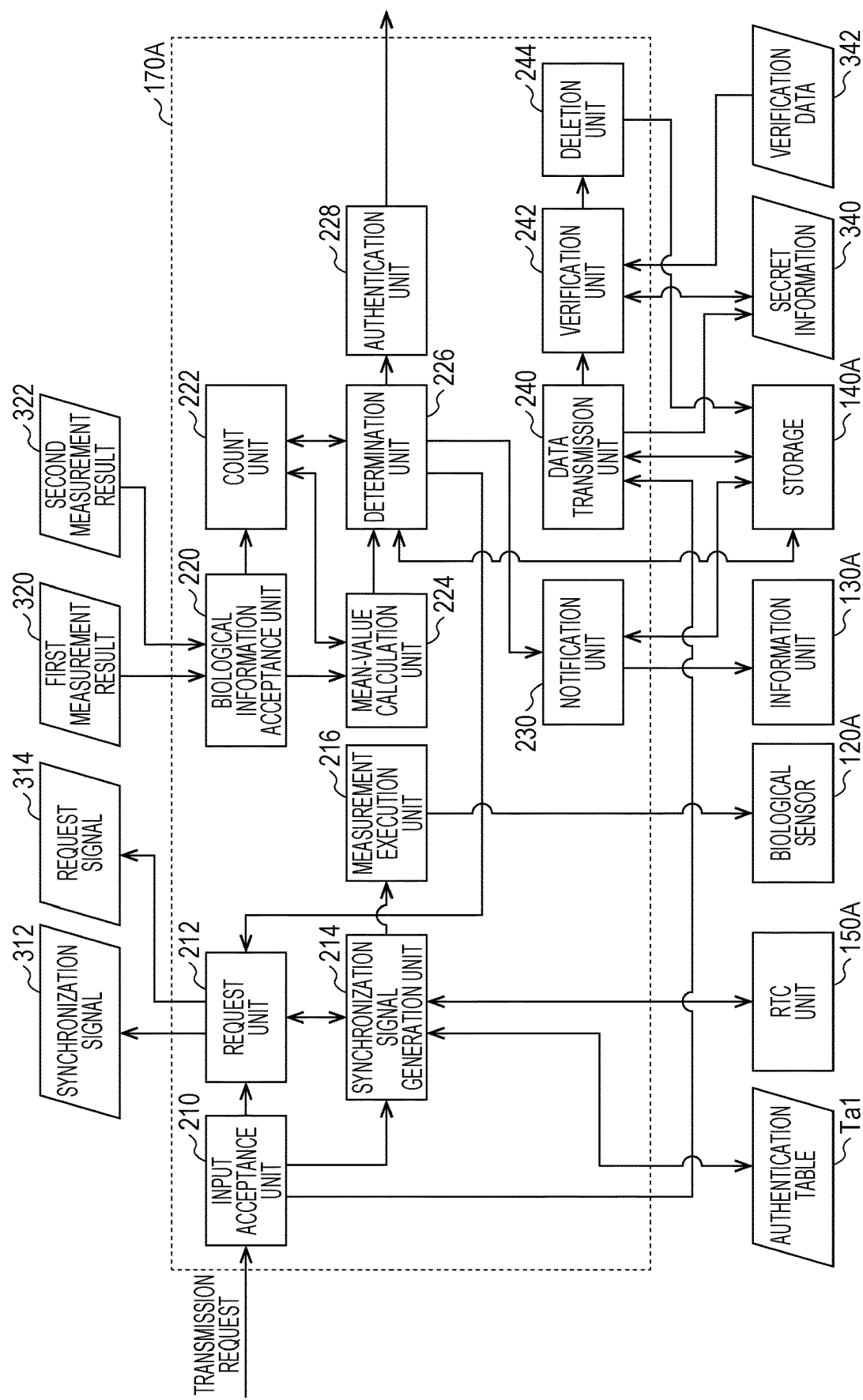
FIG. 8 is a functional block diagram explaining a functional configuration of a control unit for performing a series of authentication processing.

FIG. 8 is a functional block diagram explaining a functional configuration of the control unit 170A for performing the series of authentication processing. As illustrated in FIG. 8, the control unit 170A includes, as a main functional configuration related to the authentication processing, an input acceptance unit 210, the request unit 212, a synchronization signal generation unit 214, a measurement execution unit 216, a biological information acceptance unit 220, a count unit 222, a mean-value calculation unit 224, a determination unit 226, an authentication unit 228, and a notification unit 230. Furthermore, the control unit 170A includes, as main constituent elements related to the processing after authentication, a data transmission unit 240, a verification unit 242, and a deletion unit 244.

The input acceptance unit 210 accepts the transmission request of the secret information from the user through the operation acceptance unit 110A. The input acceptance unit 210 informs the request unit 212 and the synchronization signal generation unit 214 that the transmission request event of the secret information has occurred.

The synchronization signal generation unit 214 generates the synchronization signal based on the time clocked by the RTC unit 150A, and the number of times of measurement and the measurement interval stored in the authentication table Ta1, and outputs the signal to the request unit 212 and the measurement execution unit 216.

The request unit 212 transmits, to the information processing terminal 100B, a synchronization signal 312 input from the synchronization signal generation unit 214 and a request signal 314 requesting the measurement result of the biological sensor 120B at the timing corresponding to the synchronization signal 312 at an appropriate timing.

The measurement execution unit 216 measures biological information with the biological sensor 120A based on the synchronization signal 312 input from the synchronization signal generation unit 214.

The biological information acceptance unit 220 accepts the input of the measurement result of the biological sensor 120A (hereinafter, referred to as a first measurement result) and the measurement result of the biological sensor 120B (hereinafter, referred to as a second measurement result), and outputs the information to the mean-value calculation unit 224. The biological information acceptance unit 220 transmits a signal to the count unit 222 every time the input of the first measurement result or the second measurement result is accepted in the series of authentication processing.

The count unit 222 counts up the values stored in a counting-up circuit every time the input of the signal from the biological information acceptance unit 220 is accepted in the series of the authentication processing.

The mean-value calculation unit 224 calculates the first mean value which is the mean value of the first measurement results and the second mean value which is the mean value of the second measurement results. More specifically, the mean-value calculation unit 224 recognizes how many times each biological sensor measures biological information in the series of authentication processing referring to the count unit 222. Furthermore, the mean-value calculation unit 224 calculates each of the first and second mean values by diving the accumulated value of each of the first and second measurement results in the series of authentication processing by the number of times of measurement. The mean-value calculation unit 224 outputs the calculated first and second mean values to the determination unit 226.

The determination unit 226 determines whether the first mean value and the second mean value are congruent based on the determination criteria contained in the authentication table Ta1 referring to the storage 140A. When determining that the first mean value and the second mean value are congruent, the determination unit 226 outputs the congruity to the count unit 222, the authentication unit 228, and the notification unit 230. The count unit 222 initializes the value stored in the counting-up circuit in response to the input from the determination unit 226. The authentication unit 228 authenticates the terminal which is the transmission destination of the secret information in response to the input from the determination unit 226. The notification unit 230 reads an image requesting the permission of duplication of the secret information from the storage 140A and displays the image on the information unit 130A in response to the input from the determination unit 226.

The input acceptance unit 210 accepts the permission of duplication of the secret information from the user through the operation acceptance unit 110A, and outputs the permission to the data transmission unit 240.

The data transmission unit 240 transmits the secret information 340 stored in the storage 140A to the authenticated terminal in response to the input from the input acceptance unit 210. To the verification unit 242, verification data 342 is input from the authenticated terminal. The verification unit 242 verifies whether the transmission of the secret information 340 to the authenticated terminal has succeeded based on the verification data 342 and the secret information 340 transmitted to the authenticated terminal. The verification unit 242 outputs, to the deletion unit 244, a signal informing that the transmission of the secret information 340 to the authenticated terminal has succeeded. The deletion unit 244 deletes the secret information 340 stored in the storage 140A in response to the input from the verification unit 242.

When determining that the first mean value and the second mean value are incongruent, the determination unit 226 outputs the incongruity to the notification unit 230. The notification unit 230 reads an error image stored in the storage 140A and displays the image on the information unit 130A in response to the input, from the determination unit 226, of the signal indicating that the first mean value and the second mean value are incongruent. Thus, the user can recognize that the information processing terminal 100A has failed to authenticate the terminal which is the transmission destination of the secret information.

When determining that the first mean value and the second mean value are neither congruent nor incongruent, the determination unit 226 determines whether the measurement of the biological information with the biological sensor in the series of authentication processing has been performed less than the predetermined number of times (for example, three times) referring to the count unit 222.

When determining that the measurement of the biological information with the biological sensor has been performed less than the predetermined number of times, the determination unit 226 outputs the fact to the request unit 212. The request unit 212 requests the synchronization signal generation unit 214 to generate the synchronization signal in response to the input from the determination unit 226. The request unit 212 transmits, to the information processing terminal 100B, the synchronization signal 312 input from the synchronization signal generation unit 214 and the request signal 314 at an appropriate timing.

When determining that the measurement of the biological information with the biological sensor has been performed more than the predetermined number of times, the determination unit 226 outputs the fact to the notification unit 230. The notification unit 230 reads and displays the error image stored in the storage 140A on the information unit 130A in response to the input from the determination unit 226. Next, the processing in the information processing terminal 100B in the series of authentication processing is described.

[Processing in Information Processing Terminal 100B]

Figure 9:
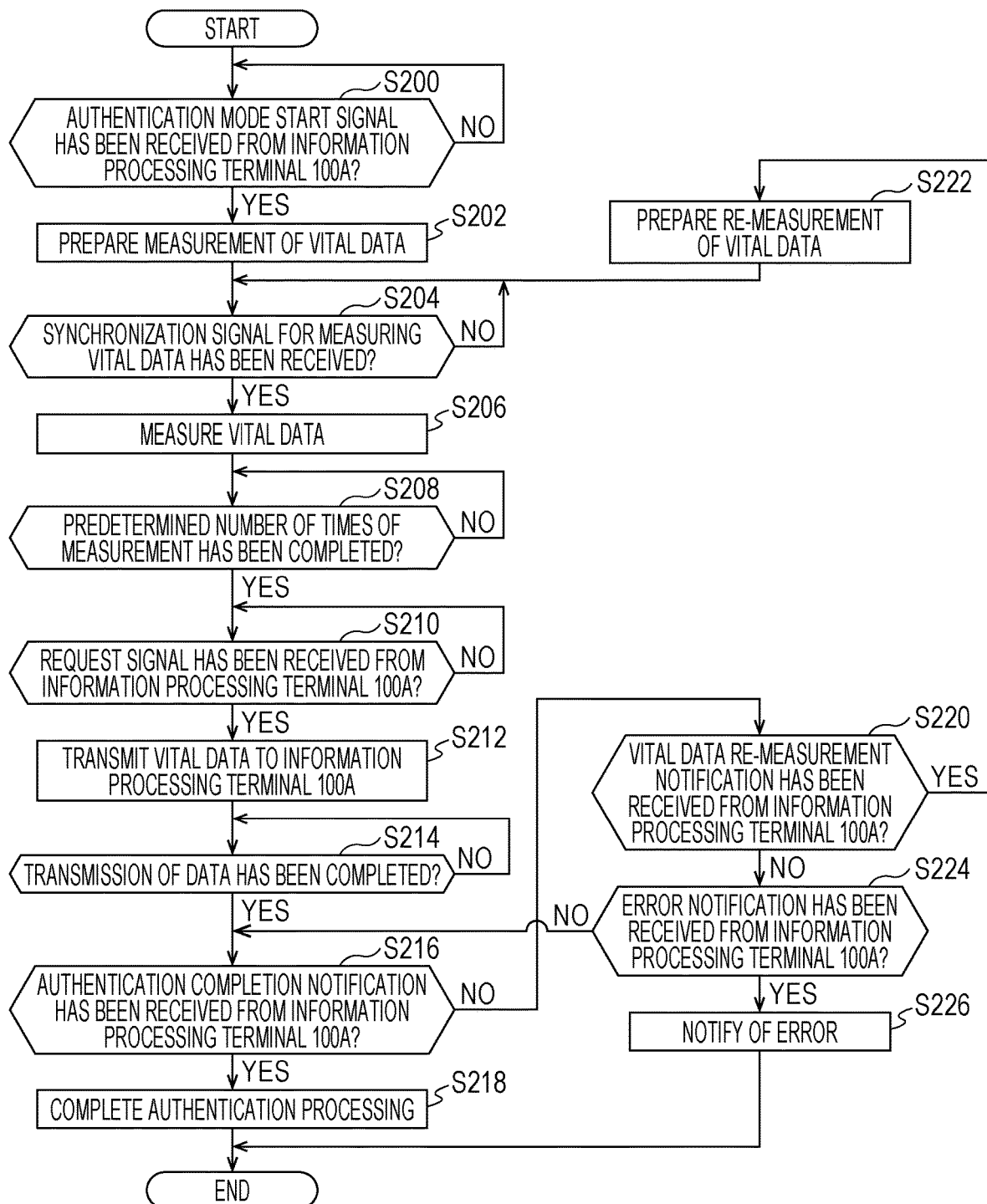
FIG. 9 is a flowchart explaining authentication processing in an information processing terminal according to an embodiment.

FIG. 9 is a flowchart explaining authentication processing in the information processing terminal 100B according to the present embodiment. The processing shown in FIG. 9 is performed by running a control program stored in the storage 140B by the control unit 170B. In another aspect, a part of or all the processing may be performed by a circuit element or other hardware.

In step S200, the control unit 170B determines whether the authentication mode start signal has been received from the information processing terminal 100A. When determining that the authentication mode start signal has been received from the information processing terminal 100A (YES in step S200), the control unit 170B proceeds the processing to step S202. If not (NO in step S200), the control unit 170B awaits the reception of the authentication mode start signal.

In step S202, the control unit 170B starts the preparation for measuring biological information (vital data) with the biological sensor 120B.

In step S204, the control unit 170B determines whether the synchronization signal has been received from the information processing terminal 100A. When determining that the synchronization signal has been received from the information processing terminal 100A (YES in step S204), the control unit 170B proceeds the processing to step S206. If not (NO in step S204), the control unit 170B awaits the reception of the synchronization signal.

In step S206, the control unit 170B performs the measurement of biological information (pulse wave) with the biological sensor 120B in accordance with the input synchronization signal. In step S208, the control unit 170B determines whether the measurement with the biological sensor 120B has been performed the predetermined number of times defined in the synchronization signal. When determining that the predetermined number of times of measurement has been completed (YES in step S208), the control unit 170B proceeds the processing to step S210. If not (NO in step S208), the control unit 170B awaits until the predetermined number of times of measurement is completed.

In step S210, the control unit 170B determines whether the request signal has been received from the information processing terminal 100A. When determining that the request signal has been received from the information processing terminal 100A (YES in step S210), the control unit 170B proceeds the processing to step S212. If not (NO in step S210), the control unit 170B awaits the reception of the request signal.

In step S212, the control unit 170B transmits the measurement result of the biological sensor 120B to the information processing terminal 100A. In step S214, the control unit 170B determines whether the transmission of the measurement result to the information processing terminal 100A has been completed. When determining that the transmission of the measurement result has been completed (YES in step S214), the control unit 170B proceeds the processing to step S216. If not (NO in step S214), the control unit 170B awaits the transmission of the measurement result is completed.

In step S216, the control unit 170B determines whether an authentication completion (success) notification has been received from the information processing terminal 100A. When determining that the authentication completion notification has been received from the information processing terminal 100A (YES in step S216), the control unit 170B authenticates the information processing terminal 100A and establishes the connection with the information processing terminal 100A. If not (NO in step S216), the control unit 170B proceeds the processing to step S220.

In step S220, the control unit 170B determines whether the request signal requesting re-measurement with the biological sensor 120B (a vital data re-measurement notification) has been received from the information processing terminal 100A. When determining that the vital data re-measurement notification has been received (YES in step S220), the control unit 170B proceeds the processing to step S222. If not (NO in step S220), the control unit 170B proceeds the processing to step S224.

In step S222, the control unit 170B starts the preparation for re-measuring biological information with the biological sensor 120B, and awaits the reception of the synchronization signal informing of the measurement timing.

In step S224, the control unit 170B determines whether an error notification informing that the measurement results of the biological sensors 120A and 120B are incongruent has been received from the information processing terminal 100A. When determining that the error notification has been received from the information processing terminal 100A (YES in step S224), the control unit 170B proceeds the processing to step S226. If not (NO in step S224), the processing is returned to step S216.

In step S226, the control unit 170B displays an image informing that the authentication of the information processing terminal 100A has failed on an information unit 130B.

CONCLUSION

According to the above, the user is only required to measure biological information with the biological sensors equipped with the information processing terminals the communication between which is desired in order for the information processing terminal 100A to authenticate the information processing terminal 100B and establish the communication therewith. Thus, the user neither needs to memorize complicated authentication information (password) nor leave the authentication information in a memorandum or the like. Consequently, the information processing system 1 according to the present embodiment secures higher security than a conventional system.

Furthermore, the information processing system according to the present embodiment uses, as authentication information between information processing terminals, biological information which is extremely difficult for a malicious third person to duplicate or acquire. Consequently, the information processing system according to the present embodiment can suppress spoofing more than a conventional system.

Although the present invention has been described and illustrated in detail, it is clearly understood that the same is by way of illustrated and example only and is not to be taken by way of limitation, the scope of the present invention being interpreted by terms of the appended claims. The scope of the present invention includes all modifications equivalent to and in claims.

What is claimed is:

1. An information processing terminal capable of communicating with a sensor terminal including a first biological sensor which measures a first type of biological information, the information processing terminal comprising:
    a computer configured to receive a measurement result of the first biological sensor from the sensor terminal;
    a second biological sensor measuring the first type of biological information; and
    wherein the computer is further configured to authenticate the sensor terminal and establish connection with the sensor terminal when the measurement result of the first biological sensor satisfies a predetermined condition on a measurement result of the second biological sensor;
    wherein the computer is further configured to determine whether the measurement result of the first biological sensor satisfies the predetermined condition by calculating a first mean value, which is a mean value of a plurality of measurement results with the first biological sensor transmitted in response to the transmission of the request signal, and a second mean value, which is a mean value of a plurality of measurement results with the second biological sensor corresponding to the respective plurality of measurement results with the first biological sensor, and determining whether the first mean value satisfies the predetermined condition on the second mean value.

2. The information processing terminal according to claim 1, wherein
    the computer is further configured to determine that the measurement result of the first biological sensor satisfies the predetermined condition when a ratio of congruity of measurement results of the first and second biological sensors in a predetermined period is equal to or more than a predetermined value.

3. The information processing terminal according to claim 2, wherein
    the computer is further configured to transmit, to the sensor terminal, a synchronization signal designating a timing to perform measurement with the first biological sensor, and
    the second biological sensor measures the first type of biological information at the timing in accordance with the synchronization signal.

4. The information processing terminal according to claim 1 further comprising:
    an input device accepting input of information, wherein the computer is further configured to transmit, to the sensor terminal, a request signal requesting measurement of the first type of biological information with the first biological sensor and transmission of a measurement result of the biological information in response to input of predetermined information to the input device.

5. The information processing terminal according to claim 4, wherein
    the computer is configured to re-transmit the request signal to the sensor terminal up to a predetermined number of times when determining that the measurement result of the first biological sensor transmitted in response to the transmission of the request signal does not satisfy the predetermined condition.

6. The information processing terminal according to claim 1, wherein
    the computer is further configured to notify of an error when determining that the measurement result of the first biological sensor does not satisfy the predetermined condition.

7. The information processing terminal according to claim 1, wherein
    the computer is further configured to communicate with the sensor terminal by short-range wireless communication at least until authenticating the sensor terminal.

8. The information processing terminal according to claim 1, wherein
    the computer is further configured to verify whether transmission of data to the sensor terminal has succeeded by comparing the data transmitted to the sensor terminal with at least a part of the data returned from the sensor terminal after authenticating the sensor terminal and establishing the connection with the sensor terminal.

9. The information processing terminal according to claim 8 further comprising:
    a non-transitory memory storing data to be transmitted to the sensor terminal, wherein
    the computer is further configured to delete, in the non-transitory memory, the data transmitted to the sensor terminal when verifying that the transmission of the data to the sensor terminal has succeeded.

10. The information processing terminal according to claim 1, wherein
    the information processing terminal is mountable on a human body.

11. An information processing system comprising:
    a first information processing terminal; and
    a second information processing terminal, wherein
    the first information processing terminal includes:
        a first biological sensor measuring a first type of biological information;
        a first computer configured to transmit a measurement result of the first biological sensor to the second information processing terminal, and
    the second information processing terminal includes:
        a display;
        a second computer configured to receive the measurement result of the first biological sensor from the first information processing terminal; and
        a second biological sensor measuring the first type of biological information;
        wherein the second computer is further configured to authenticate the first information processing terminal and establish connection with the first information processing terminal when the measurement result of the first biological sensor satisfies a predetermined condition on a measurement result of the second biological sensor;

wherein the second computer is further configured to inform, through the display, the user of an instruction for replacing mounting positions of the first information processing terminal and the second information processing terminal when determining that the measurement result of the first biological sensor does not satisfy the predetermined condition;

wherein the second computer is further configured to determine whether the measurement result of the first biological sensor satisfies the predetermined condition by
calculating a first mean value which is a mean value of measurement results of the first biological sensor and a second mean value which is a mean value of measurement results of the second biological sensor before and after informing the user of the instruction, and
determining whether the first mean value satisfies the predetermined condition on the second mean value.

12. The information processing system according to claim 11, wherein
the first information processing terminal and the second information processing terminal are mountable on a human body.

13. A non-transitory recording medium storing a computer readable program which is executed by a computer of an information processing terminal including a biological sensor which measures a first type of biological information and to communicate with a sensor terminal which measures the first type of biological information, the program for causing the computer to execute the steps of:
receiving a measurement result of the first type of biological information from the sensor terminal;
measuring the first type of biological information;
determining whether the measurement result received from the sensor terminal satisfies a predetermined condition on a measurement result of the biological information in the measuring by
calculating a first mean value which is a mean value of measurement results of the first type of biological information from the sensor terminal and a second mean value which is a mean value of measurement results of the measuring step, and
determining whether the first mean value satisfies the predetermined condition on the second mean value; and
authenticating the sensor terminal and establishing connection with the sensor terminal when it is determined that the predetermined condition is satisfied.

14. A control method of an information processing terminal including a biological sensor which measures a first type of biological information for communicating with a sensor terminal which measures the first type of biological information, the control method comprising the steps of:
receiving a measurement result of the first type of biological information from the sensor terminal;
measuring the first type of biological information;
determining whether the measurement result received from the sensor terminal satisfies a predetermined condition on a measurement result of the biological information in the measuring by
calculating a first mean value which is a mean value of the measurement result of the first type of biological information from the sensor terminal and a second mean value which is a mean value of measurement results of the measuring step, and
determining whether the first mean value satisfies the predetermined condition on the second mean value; and
authenticating the sensor terminal and establishing connection with the sensor terminal when it is determined that the predetermined condition is satisfied.

* * * * *